United States Patent [19]

Szlaga

[11] Patent Number: 4,694,847
[45] Date of Patent: Sep. 22, 1987

[54] ROLL-OVER VALVE WITH SEALING BALL

[75] Inventor: Emil Szlaga, Connersville, Ind.

[73] Assignee: Stant Inc., Connersville, Ind.

[21] Appl. No.: 916,879

[22] Filed: Oct. 9, 1986

Related U.S. Application Data

[63] Continuation-in-part of Ser. No. 911,243, Sep. 24, 1986, which is a continuation-in-part of Ser. No. 837,152, Mar. 7, 1986, Pat. No. 4,655,238.

[51] Int. Cl.$^4$ ............................................. F16K 17/36
[52] U.S. Cl. ........................................ 137/39; 137/43
[58] Field of Search .................... 137/39, 43, 202, 587

[56] References Cited

U.S. PATENT DOCUMENTS

| | | |
|---|---|---|
| 1,683,338 | 9/1928 | Evinrude . |
| 2,396,233 | 3/1946 | Abrams . |
| 3,765,435 | 10/1973 | Schlanzky ............................ 137/43 X |
| 3,996,951 | 12/1976 | Parr et al. . |
| 4,095,609 | 6/1978 | Martin . |
| 4,162,021 | 7/1979 | Crute . |
| 4,351,350 | 9/1982 | Crute . |

Primary Examiner—Robert G. Nilson
Attorney, Agent, or Firm—Barnes and Thornburg

[57] ABSTRACT

A roll-over valve is provided for use in a vehicle fuel system having an outlet for discharging fuel vapor. The roll-over valve includes a hollow valve member that terminates in a distal tip and includes a side wall. The distal tip is formed to include a top aperture and the side wall is formed to include at least one side aperture. The top aperture and side aperture cooperate to prevent the formation of a low pressure area that might otherwise be formed over the distal tip to prevent the hollow valve member from prematurely sealing the outlet. A roll-over ball is provided for moving the distal tip from an outlet-opening position to an outlet-closing position in response to tilting of the hollow valve member during vehicle roll-over conditions. A ball is provided in the hollow valve member for closing the top aperture during a selected first range of tilting positions of the hollow valve member. A float is provided for urging the ball toward its top aperture-closing position in response to an accumulation of fuel in the hollow valve member in excess of a predetermined amount during a selected second range of tilting positions of the hollow valve member.

20 Claims, 10 Drawing Figures

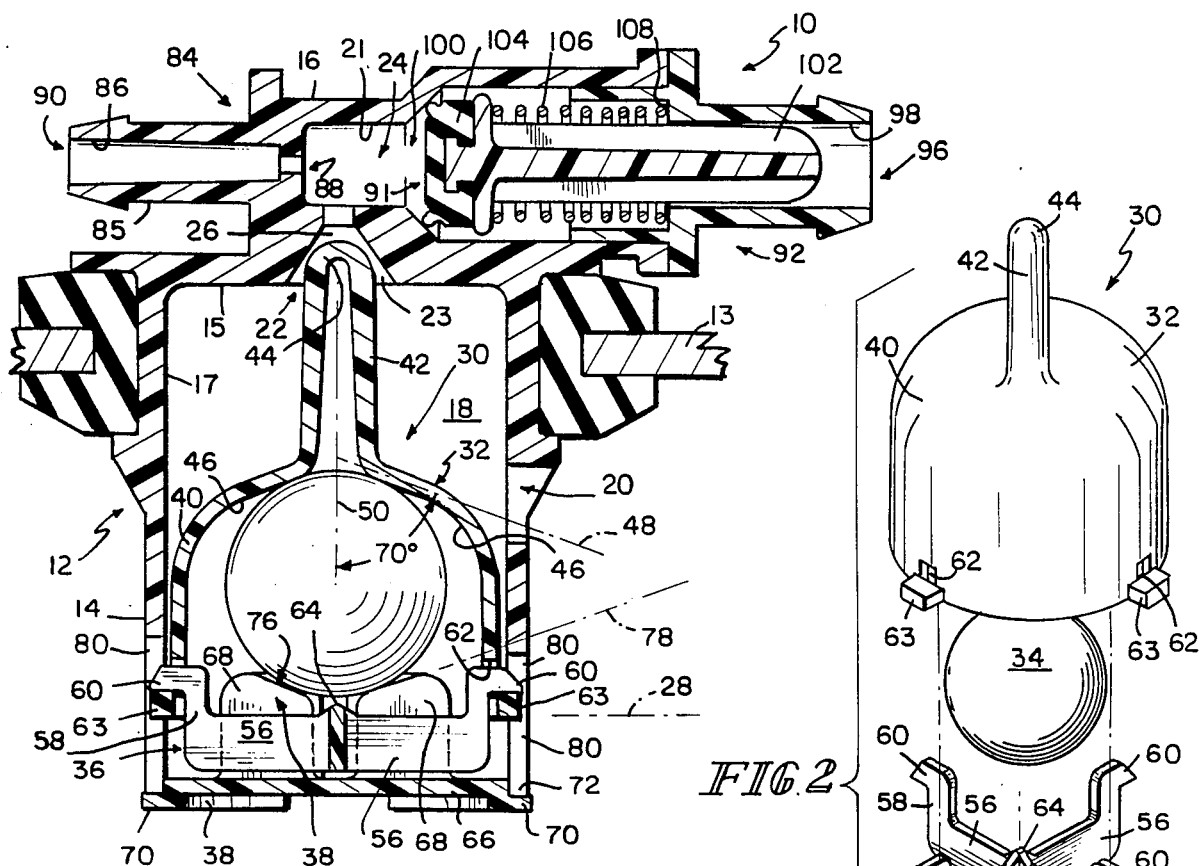
FIG. 1
FIG. 2
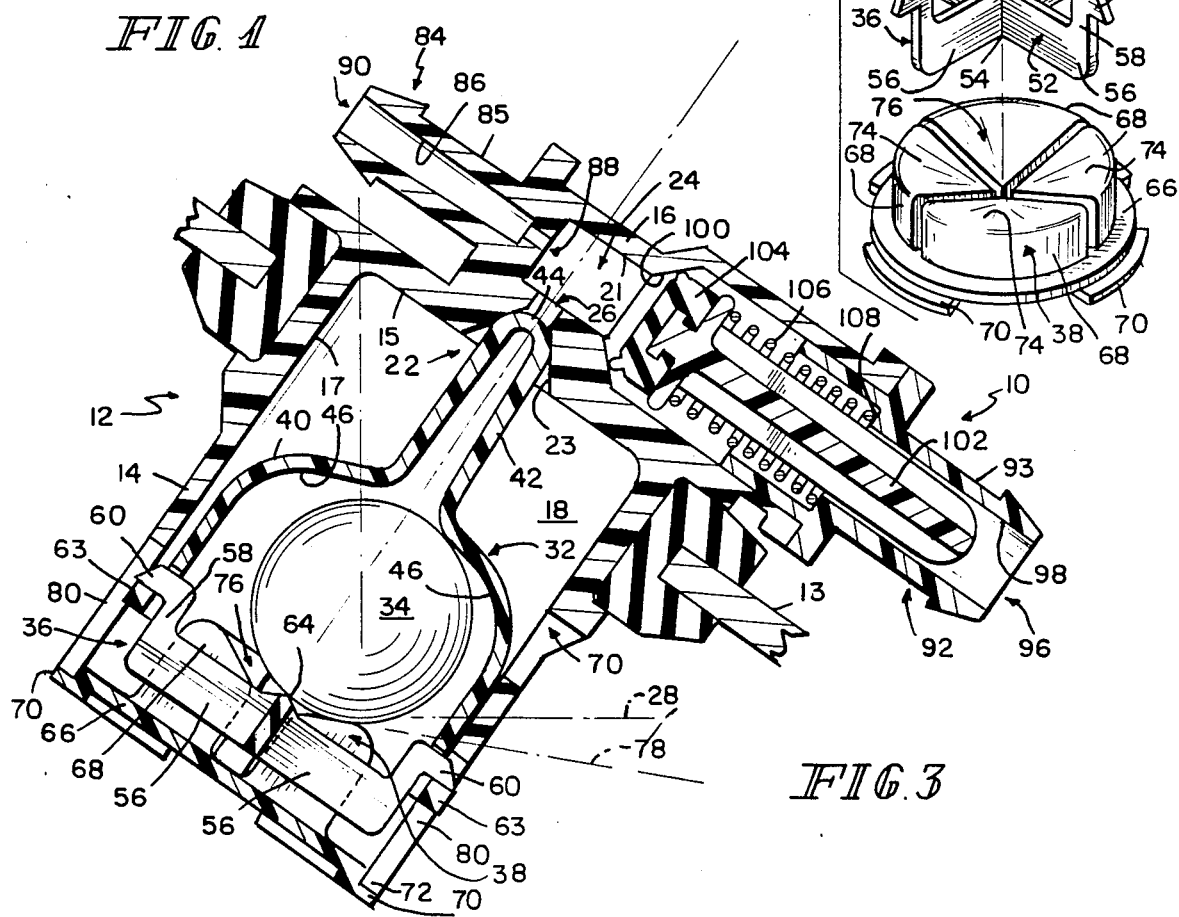
FIG. 3

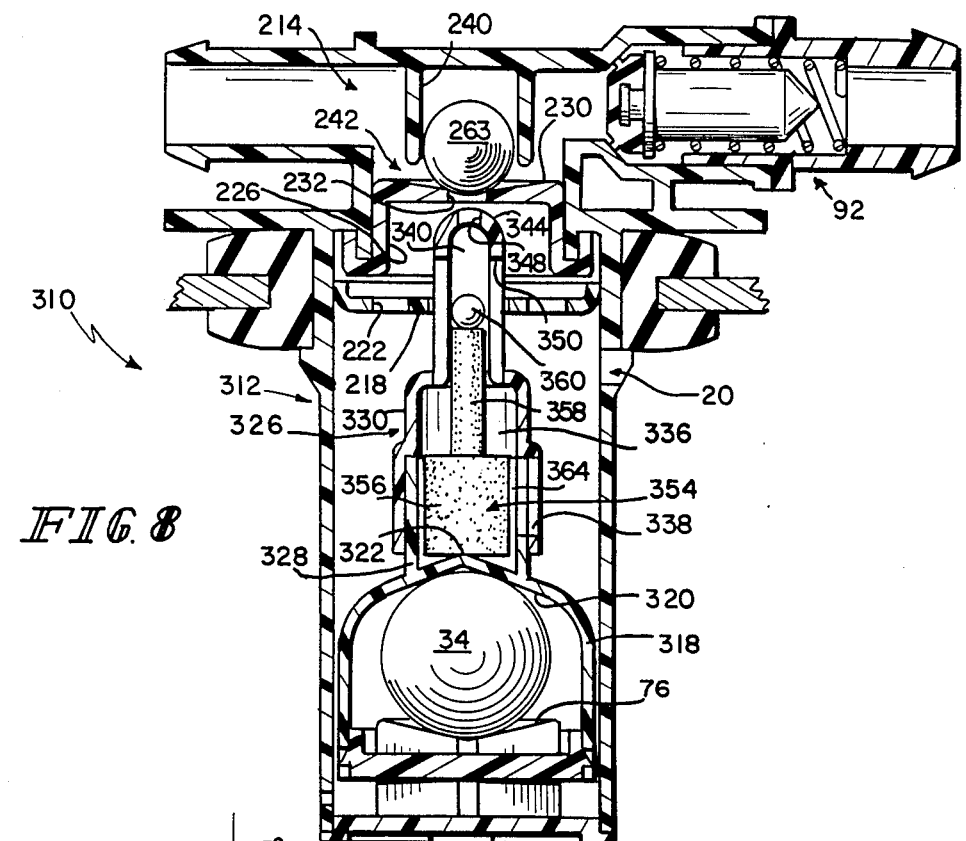
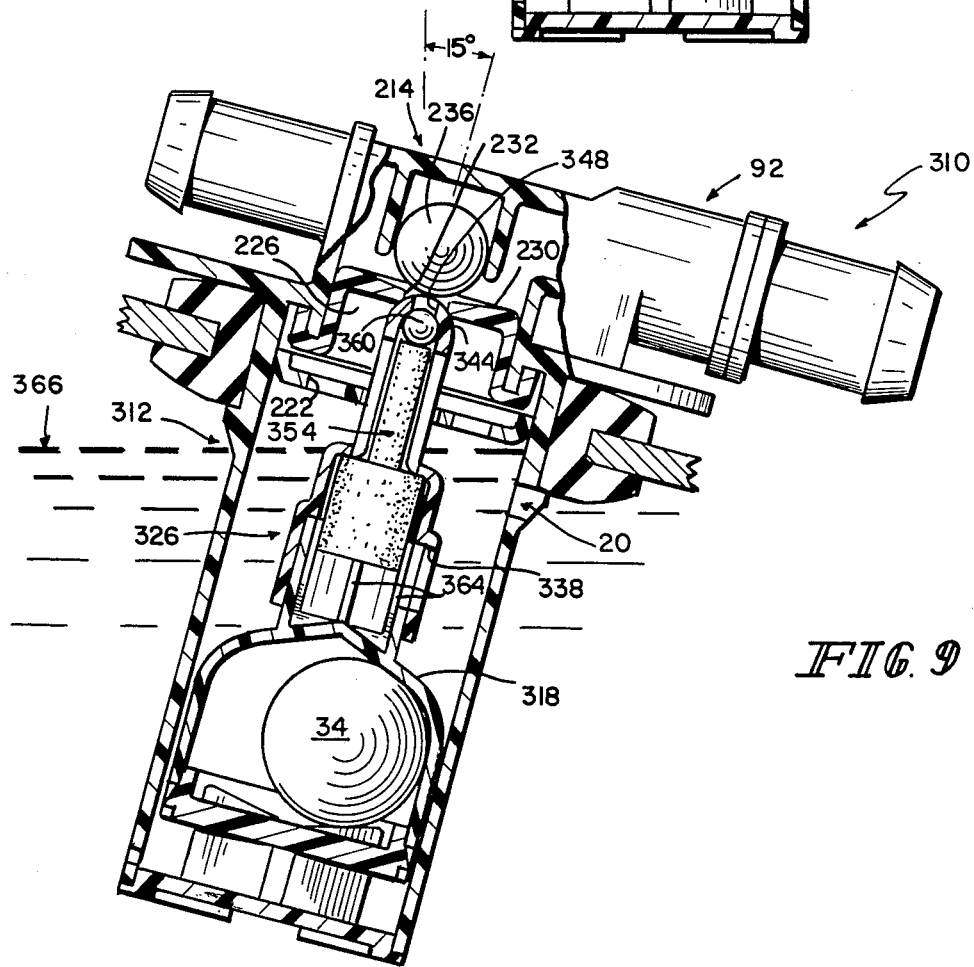

ROLL-OVER VALVE WITH SEALING BALL

BACKGROUND AND SUMMARY OF THE INVENTION

This application is a continuation-in-part of co-pending Application Ser. No. 06/911,243, filed Sept. 24, 1986, entitled FUEL VAPOR CONTROL VALVE, which is a continuation-in-part of Application Ser. No. 06/837,152, filed Mar. 7, 1986, now U.S. Pat. No. 4,655,238.

The present invention relates to fuel system valves, and particularly to a roll-over valve for closing a venting passageway in a vehicle fuel system if the vehicle is rolled over in an accident or tilted during breaking or covering. More particularly, the present invention relates to a roll-over valve having a valve stem member with a tip that is configured to prevent the formation of a low pressure area over the tip to aid in minimizing aerodynamic lifting force applied to the stem member that might otherwise move the stem member to prematurely engage and seal an outlet orifice in the valve.

Vehicle fuel systems are known to include pressure-relief roll-over valves that are mountable on either the fuel tank or the filler neck of the vehicle. These conventional roll-over valves are configured to permit fuel vapor to vent from the fuel tank when the vehicle is operating normally, and to prevent fuel from spilling from the fuel tank through the vent when the vehicle is tilted a preselected amount, or is rolled over in an accident. Desirably, a roll-over valve should be equipped to accommodate a substantial flow rate of fuel vapor from the fuel tank because of the large size of many fuel tanks, and because of the volatility of the newer blends of fuel. One problem encountered with roll-over valves that are capable of venting a substantial amount of fuel vapor is that the outbound flow of fuel vapor over the sealing stem can create a low pressure area that can impose a lifting force on the sealing stem to prematurely seal an outlet orifice in the valve. This premature sealing of an outlet orifice within the valve is not desirable because it will prevent venting of fuel vapor from the fuel tank.

One object of the present invention is to provide a roll-over valve in which the sealing stem is configured to aid in preventing the formation of a low pressure area above the stem that could cause the sealing stem to prematurely seal an orifice in the valve.

Another object of the present invention is to provide a hollow closing piece having aperture means for equalizing pressure inside the hollow closing piece with the outside surroundings to aid in minimizing any aerodynamic lift that may otherwise be exerted on the closing piece due to a high flow condition existing in a venturi passage formed between the exterior of the closing piece and an adjacent fuel system outlet. Advantageously, provision of such aperture means aids in preventing premature seating of the closing piece in the fuel system outlet.

According to the present invention, a roll-over valve is provided for use in a vehicle fuel system having a venting outlet outlet for discharging fuel vapor. The roll-over valve includes a hollow valve member that terminates in a distal tip that is formed to include a top aperture. The valve member has a side wall that is formed to include at least one side aperture that is in venting communication with the top aperture. Roll-over means is also provided for moving the distal tip of the valve member from an outlet-opening position to an outlet-closing position in response to tilting of the valve member during vehicle roll-over conditions. Closing means disposed within the hollow valve member is provided for closing the top aperture in response to predetermined tilting movements of the hollow valve member so that passage of fuel through the outlet is blocked.

One feature of the foregoing structure is that the distal tip of the hollow valve member is formed to include a top aperture, and the side wall of the valve member is formed to include at least one side aperture that is in communication with the top aperture. One advantage of this feature is that the side aperture and top aperture cooperate to establish an air flow passage through the hollow valve member, thereby equalizing the pressure inside and outside of the hollow valve member. Such pressure equalization means aids in preventing the formation of a low pressure area above the tip of the valve member, thereby minimizing any aerodynamic lifting force from being imposed on the valve member by high velocity flow between the valve member and the adjacent fuel system wall surrounding the venting outlet.

Another feature of the foregoing structure is that closing means is provided within the valve member to close the top aperture in response to predetermined tilting movements of the hollow valve member so that passage of fuel through the outlet is blocked. One advantage of this feature is that the top aperture in the valve member can be selectively sealed to permit the valve member to block the flow of fuel from the vehicle fuel system under certain circumstances.

In preferred embodiments of the present invention, the closing means includes a sealing ball that is configured to sealingly close the top aperture. The sealing ball is configured to move within the hollow valve member under gravity to its aperture-closing position during a selected first range of tilting positions of the hollow valve member. One feature of the foregoing structure is that the sealing ball is capable of moving to the top aperture-closing position after the hollow valve member has been tilted past an angle of approximately 90°. One advantage of this feature is that should the vehicle roll over past 90° due to an accident, the sealing ball will be urged by gravity to close the top aperture in the hollow valve member to permit the valve member to seal the venting outlet in the roll-over valve to prevent fuel from being discharged through the valve.

Also in preferred embodiments of the present invention, the closing means further includes float means for urging the sealing ball in the hollow valve member toward its top aperture-closing position in response to fuel in the valve member in excess of a predetermined amount so that the sealing ball is moved by the float means to sealingly close the top aperture during a selected second range of tilting positions of the hollow valve member. One feature of the foregoing structure is that a float is provided that is responsive to the presence of fuel within the roll-over valve. The float is configured to urge the sealing ball toward its top aperture-closing position to allow the valve member to seal the outlet opening in the roll-over valve when the roll-over valve has been tilted a selected number of degrees from its normal upright position. Illustratively, the selected number of degrees is from between approximately 15° to approximately 90°. One advantage of this feature is that should the roll-over valve and vehicle be tilted within the above range, and fuel is present in the roll-over valve, the float will urge the sealing ball to its aperture-closing position to prevent fuel from being discharged from the valve through the top aperture.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which:

FIG. 1 is a sectional detail view of one embodiment of a valve in accordance with the present invention showing the valve in a normal, upright position;

FIG. 2 is an exploded assembly view of one portion of the valve shown in FIG. 1;

FIG. 3 is a view of the valve illustrated in FIG. 1 showing the valve in a tilted position;

FIG. 8 is a transverse sectional view through yet another embodiment of the present invention;

FIG. 9 is a transverse sectional view showing the embodiment of FIG. 8 in a tilted orientation with fuel present in the valve.

DETAILED DESCRIPTION

Figure 5:
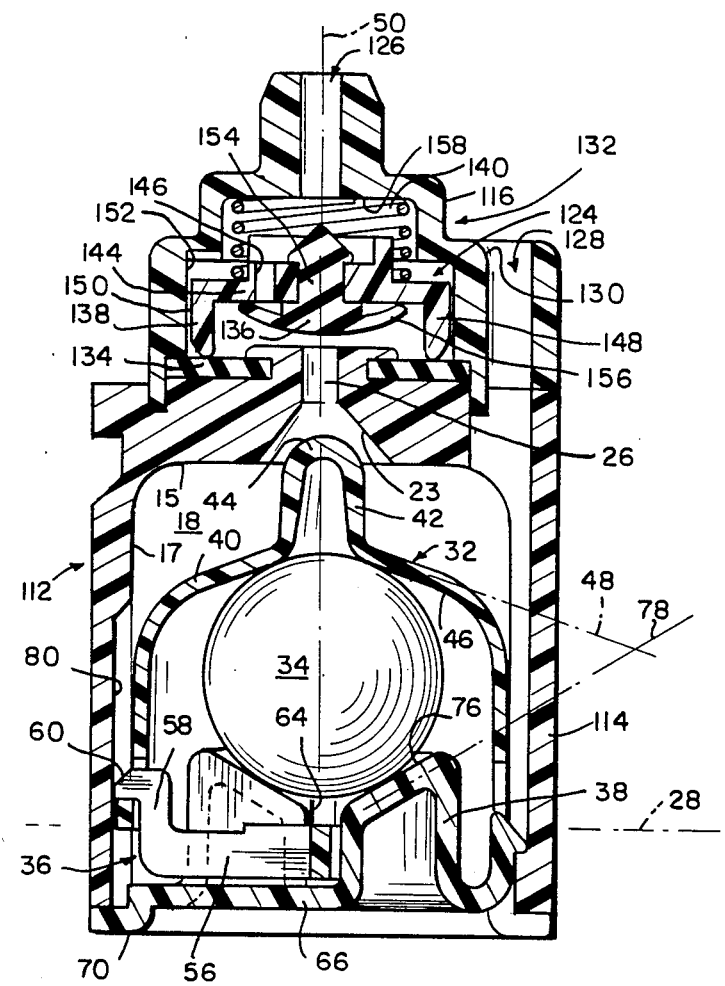
FIG. 5 is a sectional detail view of yet another embodiment of the present invention.

A first embodiment of the invention is illustrated in FIGS. 1-3. A valve assembly 10 is provided for use with a conventional fuel system (not shown) having a fuel tank and a fuel vapor storage canister. Referring particularly to FIGS. 1 and 3, the valve assembly 10 includes a hollow valve housing 12 mounted to a wall 13 of a fuel tank or the like and having a lower roll-over safety portion 14 and an upper pressure-relief portion 16.

The lower roll-over safety portion 14 includes a top wall 15 and a generally cylindrical side wall 17 which cooperate to define a valve chamber 18 having an inlet 20 formed in the side wall 17 and an outlet 22 formed in the top wall 15. The inlet 20 is in fluid/vapor communication with a fuel tank or the like. The lower portion 14 is formed to include an axially downwardly-facing, generally conical valve seat 23 in concentric registry with outlet 22.

The upper pressure-relief portion 16 is formed to include an interior wall 21 defining a vapor discharge chamber 24, and a passageway 26 interconnecting the vapor discharge chamber 24 and the outlet 22 of the valve chamber 18 in fluid/vapor communication. During vehicle operation, fuel vapors accumulated in the fuel tank are introduced into the valve chamber 18 under pressure. These fuel vapors are selectively transmitted via fluid-conducting passageway 26 to the vapor discharge chamber 24 for subsequent distribution to the canister (not shown) and to the atmosphere.

A roll-over assembly 30 is installed in the lower portion 14 to control fluid flow through the fluid-conducting passageway 26. The roll-over assembly 30 automatically closes the valve chamber outlet 22 during vehicle rollover and change in vehicle motion to prevent the flow of liquid fuel and/or fuel vapors through passageway 26 and into both of the canister and the atmosphere, thereby lessening the danger of explosion or other hazard.

As soon as a rolled-over vehicle is substantially returned to an upright position, the roll-over assembly 30 functions to open the valve chamber outlet 22 to permit resumption of unimpeded flow of fuel vapors through passageway 26. As shown best in FIG. 2, the roll-over assembly 30 includes a valve member 32, a stainless steel ball 34, a ball retainer 36, and a valve member retainer 38. The roll-over assembly 30 can be preassembled in a manner described below and installed in the valve chamber 18.

The valve member 32 includes a downwardly opening ball-receiving cup 40 and an integral upstanding valve stem 42. The valve stem 42 has a distal, spherical end 44 for engaging valve seat 23 to close the chamber outlet 22. An interior wall of the cup 40 is configured to define a novel first inclined ramp portion 46. As shown best in FIG. 1, the first inclined ramp portion 46 is substantially defined by a downwardly-extending generatrix 48 to present a downwardly-opening, outwardly-extending, contoured, flared camming surface. Illustratively, the first inclined ramp portion 46 is positioned in relation to the longitudinal axis 50 of the valve housing 12 to define an included angle of about 70°. In other words, the novel first ramp portion 46 is inclined at an angle of about 20° relative to horizontal reference plane 28.

The ball retainer 36 includes a crisscross frame 52 for retaining the ball 34 in the inverted cup 40. The crisscross frame 52 includes a center portion 54 and four mutually perpendicular arms 56 extending away from center portion 54. Each arm 56 includes a distal end 58 and an outwardly turned L-shaped mounting tab 60 extending upwardly therefrom for snapping into engagement with four circumferentially spaced-apart mounting holes 62 formed in the lowermost portion of the inverted cup 40. A tab-supporting flange 63 is provided on the exterior of the cup 40 underneath each mounting hole 62 to support a mounting tab 60 extending therethrough. A raised contact surface 64 extends upwardly from the center portion 54 of the crisscross frame 52 to a point below the upwardmost extension of the mounting tabs 60.

The valve member retainer 38 illustratively includes a base member 66 and four integral upstanding wedge members 68 for retaining the valve member and ball retainer assembly 32, 36 in the valve housing 12. The base member 66 includes mounting flanges 70 for snapping into engagement with circumferentially spaced-apart channels 72 formed in the lowermost portion of valve housing 12 as shown best in FIGS. 1 and 3.

The distal ends 74 of upstanding wedge members 68 cooperate to define a second inclined ramp portion 76. As shown best in FIG. 1, the second inclined ramp portion 76 is substantially defined by an upwardly-extending generatrix 78 to present an upwardly-opening, outwardly-extending, contoured, flared camming surface. Illustratively, the second inclined ramp portion 76 is positioned in relation to the longitudinal axis 50 of the valve housing to define an included angle of about 70°. In other words, the second ramp portion 76 is inclined at an angle of about 20° relative to horizontal reference plane 28. Advantageously, the first and second inclined ramp portions 46, 76 cooperate to convert radially-outward movement of a ball disposed therebetween in camming relation into axially-upward movement of the valve stem 42 toward the chamber outlet 22 during tilting of the valve housing 12.

The roll-over assembly 30 illustrated in FIG. 2 is assembled and installed in the valve chamber 18 in the manner described below. When assembled, the valve member 32 is movable within the valve chamber 18 between a chamber outlet-opening position shown in FIG. 1 and a chamber outlet-closing position shown in FIG. 3.

The ball retainer 36 is coupled to the valve member 32 to retain a ball 34 disposed within the interior of the inverted cup 40 by inserting the mounting tabs 60 of the crisscross frame 52 into the respective mounting holes 62 formed in the cup 40 in abutting relation to the tab-supporting flanges 63. The valve member 32 and the ball retainer 36 are configured to permit movement of the trapped ball 34 in a radially-outward direction during tilting of the valve housing while substantially limiting movement in axially outward and inward directions. The valve member retainer 38 is then interengaged with the ball retainer 36 by inserting the four distal ends 74 of the upstanding wedge member 68 into the four spaces intermediate mutually-perpendicular frame arms 56. This "loose" assembly is then mounted in the valve housing 12 by: (1) inserting the valve stem 42 into the lower opening in the valve housing 12 so that the valve stem 42 extends through the chamber outlet 22 and is in close proximity to valve seat 23; (2) inserting mounting tabs 60 and companion tab-supporting flanges 63 into a like plurality of axially elongated circumferentially spaced-apart guide slots 80 formed in the valve housing 12 as shown in FIGS. 1 and 3; and then (3) interengaging the mounting flanges 70 of the base member 66 and the channels 72 formed in the valve housing 12.

When assembled, the valve member retainer 38 is fixed in relation to the valve housing 12 while the valve member and ball retainer assembly is guided by guide slots 80 for movement along the longitudinal axis 50 of the valve housing between chamber outlet-closing and -opening positions. In addition, when the valve member 32 is in its chamber outlet-opening position, the second inclined ramp portion 76 is situated to overlie the contact surface 64 so that the downwardly-presented surface of the ball 34 is seated on the second inclined ramp portion 76 without contacting the contact surface 64 of the ball retainer 36. As will be explained, the contact surface 64 provides means for transmitting the gravitational force of the ball 34 to the valve member 32 via the ball retainer 36 to aid in moving the valve member 32 from its outlet-closing position toward its outlet-opening position.

A constant orifice valve 84 is provided in the upper pressure-relief portion 16 of the valve housing 12 for discharging a substantially constant volumetric flow rate of fuel vapor from the hollow valve housing 12 to a canister (not shown). The constant orifice valve 84 includes an overflow tube 85 having a fluid-conducting passageway 86. The passageway 86 includes an inlet orifice 88 of uniform cross-section in fluid communication with the vapor discharge chamber 24 and an outlet 90 that is connectable to a conventional canister. Fuel vapors discharged from the fuel tank into the vapor discharge chamber 24 are distributable to the canister via constant orifice valve 84.

A variable flow valve 92 is also provided in the upper pressure-relief portion 16 of the valve housing 12 for selectively discharging a controlled volume of fuel vapor from the hollow valve housing 12 to the atmosphere. The variable flow valve 92 includes a purge tube 93 having an inlet orifice 94 in fluid communication with the vapor discharge chamber 24, an outlet orifice 96 that empties into the atmosphere, and a fluid-conducting passageway 98 extending therebetween. The innermost portion of passageway 98 is formed to include a generally conical valve seat 100 in concentric registry with the inlet orifice 94. The valve seat 100 defines a diverging nozzle extending in a direction toward the outlet orifice 96.

In order to vary selectively the flow of fuel vapor to the atmosphere through passageway 98, an elongated valve stem 102 having a valve seal 104 at its innermost end is positioned in passageway 98. The valve seal 104 is yieldably urged into closing engagement with the valve seat 100 by means of a coiled compression spring 106 which seats on an abutment ring 108 formed to extend into the passageway 98 intermediate the inlet 94 and outlet 96.

In operation, ball 34 rides on both of the opposing first and second inclined camming surfaces 46, 76 to move the valve stem 42 upwardly into closing engagement with the valve seat 23 surrounding the chamber outlet 22 in response to tilting movement of the valve housing 12 during vehicle rollover and abrupt changes in vehicle motion. Illustratively, included angles of about 70° are formed between the longitudinal axis 50 and each of the ramp-defining, upwardly-extending and downwardly-extending generatrices, 78 and 48, respectively. These particular angles were selected so that the novel pair of opposing companion inclined surfaces would cooperate to convert radially outward movement of ball 34 into axially upward movement of valve member and ball retainer assembly 32, 36 so as to cause the valve stem 42 to move into closing engagement with valve seat 23 when the longitudinal axis 50 is tilted at least at an angle of about 35° (See FIG. 3) from its normal upright vertical position (See FIG. 1).

One object of the present invention is to provide a fuel tank valve having a roll-over safety valve, an integral flow orifice to control fuel vapor flow to the canister, and also an on/off vapor release valving mechanism for purging fuel tank vapors to the atmosphere. Advantageously, the vapor release valve provides means for venting selected amounts of fuel tank vapor to the atmosphere to improve hot engine performance by minimizing fuel tank pressure and reducing fuel vapor mass flow to the canister. The vapor release valve of the present invention permits excess pressure to be relieved to the atmosphere. This protects the purge air from becoming excessively saturated, and consequently, enhances vehicle driveability. The novel "double ramp" design of the roll-over assembly 30 effectively overcomes problems that were encountered during the development of a fuel tank valve having a canister discharge valve (e.g., 84) and an atmosphere discharge valve (e.g., 92).

During development of the fuel tank valve of the present invention, it became necessary to enlarge the chamber outlet orifice 22 to accommodate the increased fuel vapor flow rate created by the addition of atmospheric purge valve means 92, and also meet minimum performance criteria. One problem caused by enlargement of the chamber outlet orifice 22 was an increase in the differential pressure at the chamber outlet 22. This increased differential pressure increased an upwardly-directed applied force on the valve stem 42 in each of a roll-over and excessive vibration condition. This applied force acted to retain unnecessarily the valve stem 42 in its seated vent passageway-closing position (See FIG. 3) long after the rolled over vehicle (and tilted fuel tank valve) had been returned to an upright position (See FIG. 1) following an accident. Such an unwanted applied force has also been observed in cases where a vehicle fuel tank valve having an enlarged chamber outlet 22 is subjected to excessive vibration.

The foregoing developmental "valve closure" problem was alleviated in the present invention by increasing the mass of the ball 34 to increase the downwardly directed gravitational force of the ball 34 and thereby counteract the pressure- or vibration-induced upwardly-directed applied force on the valve stem 42. This was accomplished by enlarging the diameter of the ball 34 itself a sufficient amount to nearly double the weight of the ball 34. However, one problem caused by enlargement of the ball 34 was an effective reduction in the ball-receiving space defined by inverted cup 40 and the ball retainer 36. Packaging requirements prohibited increasing the volume of inverted cup 40 to compensate for enlargement of the ball 34. In effect, necessary enlargement of the ball diameter without increasing the cup diameter created a geometric condition that limited radially outward travel of trapped ball 34 and thereby reduced the axial travel of the valve member 32 in the valve chamber 18 during vehicle rollover. The effect of such a reduction in axial travel of the valve member 32 was that the ball 32 did not operate to lift the valve stem 42 into closing engagement with valve seat 23 when the longitudinal axis 50 of the valve housing 12 was tilted at an angle of about 20° relative to vertical during the vehicle roll-over accident.

The novel "double ramps" 46, 76 of the present invention provide a remedy to the foregoing developmental problems by increasing the vertical lift of the valve member 32 without necessitating enlargement of the volume of inverted cup 40 to provide space for increased radially outward movement of the valve member-driving ball 34 during vehicle rollover. Although each of the generatrices 48, 78 of camming ramps 46, 76 are inclined at an angle of about 20° in relation to horizontal reference plane 28, the positioning of camming ramps 46, 76 in opposing spaced-apart facing relation causes the camming ramps 46, 76 to cooperate to define an "effective ramp surface" of about 40° in relation to horizontal reference plane 28. This novel feature advantageously operates to increase valve member lift without actually increasing the slope of the generatrix 78 of the first inclined ramp portion 76 to a theoretically necessary above-noted angle of about 40°.

In summary, the function of the valve member and ball retainer assembly 32, 36 is twofold. First, the novel configuration of inverted cup 40 defining first inclined ramp portion 46 operates to position the valve stem 42 in closing engagement with the valve seat 23 when the valve housing is tilted at an angle of about 20° in relation to the vertical during vehicle rollover. Second, the contact surface 64 of the ball retainer 36 engages the downwardly-facing surface of ball 34 as the valve member 32 travels from its outlet-closing to its outlet-opening position to provide sufficient downward force on the valve stem 42 to prevent the valve stem 42 from being held against the valve seat 23 surrounding the chamber outlet 22 during a vapor flow condition caused by vehicle rollover, excessive valve housing vibration, or the like.

Figure 4:
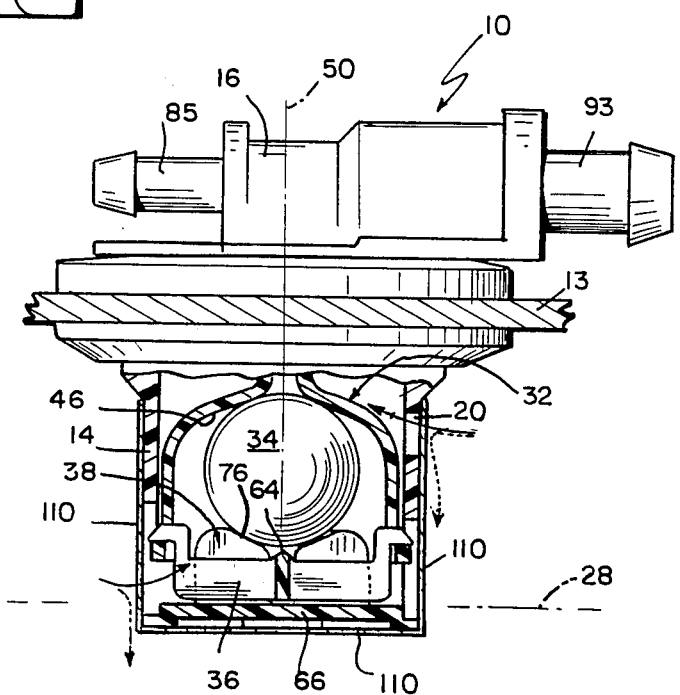
FIG. 4 is a sectional detail view of another embodiment of the present invention.

In another embodiment of the invention illustrated in FIG. 4, those elements referenced by numbers identical to those in FIGS. 1-3 perform the same or similar function. A discriminator filter 110 is positioned to cover the vapor flow inlet openings (e.g. 20) in the lower portion 14 of valve housing 12. One object of filter 110 is to retard liquid fuel flow into and through the valve assembly 10 during times of excessive fuel sloshing in the fuel tank, thereby advantageously minimizing unnecessary discharge of fuel through the valve assembly 10.

Preferably, the filter 110 is formed of a porous plastics material or the like which retards liquid fuel flow (represented by broken lines in FIG. 4) into the valve chamber 18 without substantially impairing the flow of fuel vapor (represented by solid lines in FIG. 4) through the vapor flow inlet openings. In the embodiment illustrated in FIG. 4, filter 110 is a porous skirt positioned to surround and embrace the exterior wall of the lower portion 14 of valve housing 12. It will be appreciated that filter 110 could be formed and positioned in a variety of other shapes and manners without impairing the operation thereof.

In another embodiment of the invention illustrated in FIG. 5, those elements referenced by numbers identical to those in FIGS. 1-3 perform the same or similar function. In the embodiment of the valve assembly shown in FIG. 5, valve housing 112 includes a lower roll-over safety portion 114 and an upper tank pressure control valve portion 116. The valve housing 112 can be mounted in a fuel sender unit (not shown) or in any other convenient position within the fuel tank.

The components housed in the lower roll-over safety portion 114 function in a manner similar to that shown in FIGS. 1-3. However, in this embodiment the second inclined ramp portion 76 is configured so as to position the upwardly-extending generatrix 78 in relation to the longitudinal axis 50 of the valve housing to define an included angle of about 60°. In other words, the second ramp portion is inclined at an angle of about 30° relative to the horizontal reference plane 28. This incline is about 10° steeper in comparison to the incline illustrated in the embodiment of FIGS. 1-3 so as to delay slightly the actuation of the roll-over valve to meet predetermined performance criteria. It will be understood that the inclined angles of either or both of ramp portions 46, 76 can be varied to change the "effective ramp surface" provided by the novel double ramps 46, 76 of the present invention.

The upper tank pressure control valve portion 116 functions to regulate the pressure within the fuel tank (not shown) thereby advantageously controlling maximum fuel tank pressure.

In particular, the upper portion 116 is formed to include a vapor discharge chamber 124 in fluid communication with the fluid-conducting passageway 26, an outlet passage 126 in fluid communication with the vapor discharge chamber 124, and an inlet passage 128 in fluid communication with the valve chamber 18 formed in the lower portion 114. Importantly, inlet mouth 130 of the inlet passage 128 is positioned about at the highest location within the fuel tank (not shown) to reduce the likelihood of liquid-fuel carryover into the valve assembly during fuel sloshing. Of course, a discriminator filter, similar in function to filter 110 of FIG. 4, could be installed at a suitable location to filter fuel vapor introduced into inlet passage 128.

A pressure-vacuum valve assembly 132 is installed in vapor discharge chamber 124 to regulate pressure in the fuel tank (not shown). The pressure-vacuum valve assembly 132 includes a gasket 134, an umbrella valve 136, a valve carrier 138, and a spring 140. The gasket 134 is positioned on a bottom wall 142 of valve vapor discharge chamber 124 to surround passageway 26. The valve carrier 138 includes a central portion forming four circumferentially-spaced fluid-conducting apertures 146, a peripheral ring flange 148 defining an exterior sidewall 150 positioned in close proximity to an interior wall 152 of the vapor discharge chamber 124 to define an annular passageway therebetween. The umbrella valve 136 is made of a pliable material and includes a stem 154 that is installed in a central aperture formed in the valve carrier 138 and a resilient valve cover 156 that is positioned normally to cover the lower opening of each of the circumferentially-spaced fluid-conducting apertures 146 formed in the valve carrier 138 as shown in FIG. 5. The spring 140 is installed in the vapor discharge chamber 124 between a top wall 158 thereof and a top surface of the valve carrier 138. Thus, the spring 140 provides means for yieldably urging the ring flange 148 into seating engagement with the gasket 134.

In operation, the spring-biased valve carrier 138 functions to vent fuel vapor from the fuel tank and valve assembly only when the pressure exceeds a predetermined threshold level. Pressurized fuel tank vapor can exert a lifting force on the valve carrier 138 to urge the same against the spring 140, thereby lifting ring flange 148 off gasket 138 to open the annular passageway between the valve carrier 138 and the interior chamber wall 152. The fuel vapor is then discharged from the valve housing 112 via outlet 126 and conducted to a treatment site such as a conventional fuel canister (not shown). The mass and configuration of a valve carrier 138, the size of the various fluid-conducting passages, and the spring constant of the spring are selected to define the threshold pressure level. Thus, the pressure-vacuum valve assembly 132 functions to regulate the maximum pressure allowable in the fuel tank (not shown).

The umbrella valve 136 regulates flow of ambient air or the like from the canister into the valve chamber 18 and the fuel tank in response to suction caused by a vacuum in the fuel tank. Sub-atmospheric pressure in the fuel tank will exert a downwardly-directed force to the resilient valve cover 156 to at least partially open the umbrella valve 136 and draw ambient air or the like through outlet passage 126 and valve carrier apertures 146 into the valve chamber 118 via the fluid-conducting passageway 26. A vacuum created in the fuel tank, due to condensation or the like, will act to draw fuel/fuel vapor from the canister back into the tank. This will prevent the pressure in the fuel tank from dropping to zero and hold the tank pressure constant during an overnight vehicle cool-down or short-term vehicle parking.

One notable feature of this embodiment is that fuel vapor is introduced into the valve chamber 18 only from a point above the valve member 32 so that the fuel vapor is shunted generally away from the interior of the ball-receiving cup 40 defined by the valve member 32. Advantageously, this feature causes the vapor path within the valve housing 112 generally to "push down" on the exterior surface of the valve member 32 and thereby substantially prevent fuel vapor from prematurely lifting the valve member 32 toward its vent-closing position within the valve chamber 18 prior to vehicle rollover.

Figure 7:
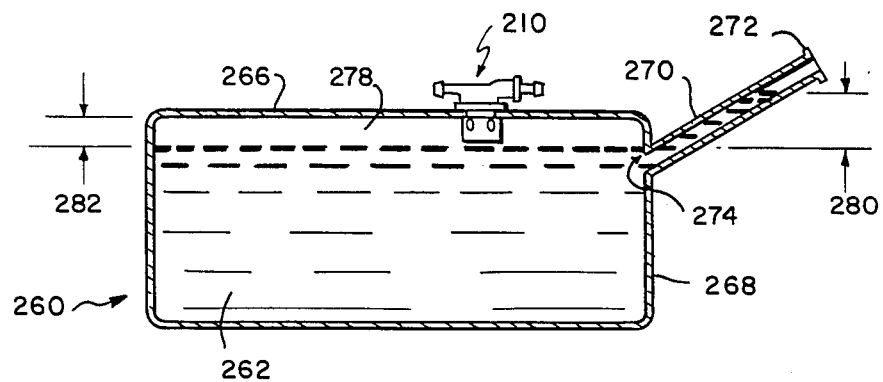
FIG. 7 is a diagrammatic illustration of the valve assembly of FIG. 6 in a working environment.
Figure 6:
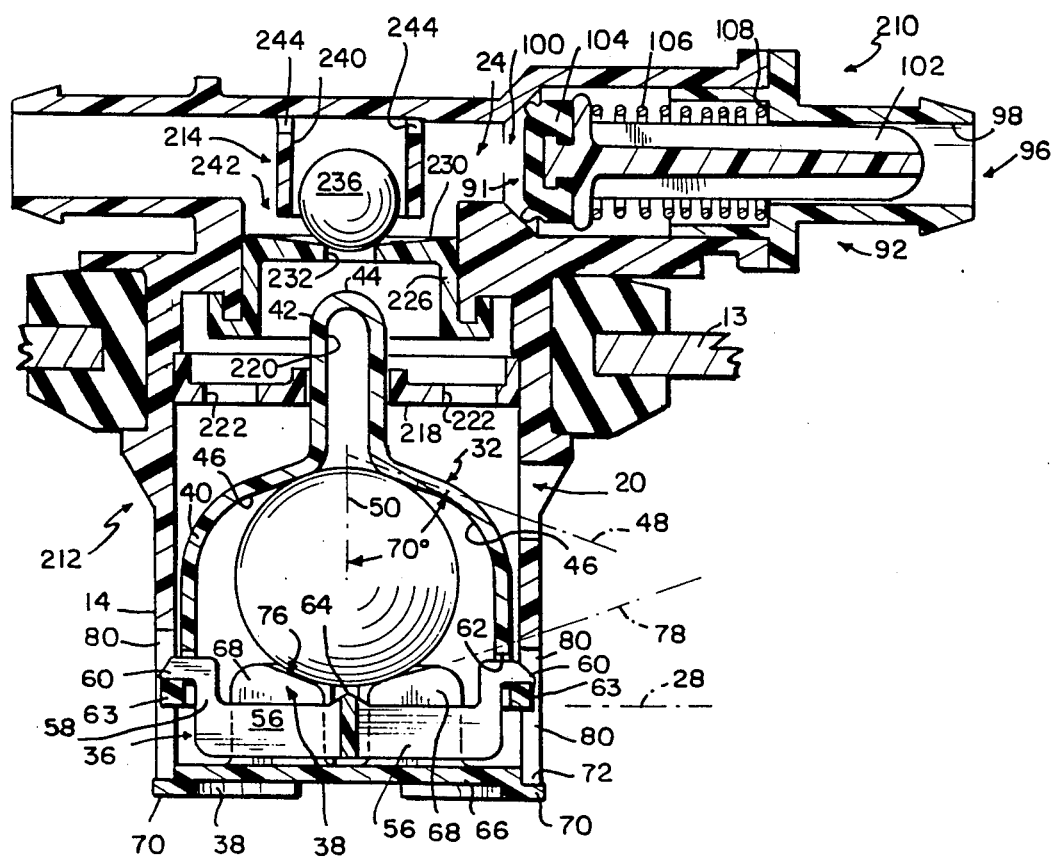
FIG. 6 is a transverse sectional view through yet another embodiment of the present invention.

FIG. 6 shows another embodiment of the invention that is a modification of the embodiment illustrated in FIG. 5. Those elements referenced by numbers identical to those in FIGS. 1-5 perform the same or similar function. In the embodiment of the valve assembly 210 shown in FIG. 6, valve housing 212 includes a pressure valve assembly 214 to control the discharge of pressure from the fuel tank 260 (FIG. 7). The pressure valve assembly 214 functions somewhat differently than the pressure-vacuum valve assembly 132 illustrated in the embodiment of FIG. 5. Specifically, the pressure-vacuum valve assembly 132 in the embodiment illustrated in FIG. 5 is configured to maintain a predetermined pressure within the fuel tank at all times. The valve assembly 132 is configured to vent fuel vapor from the fuel tank only when the pressure in the tank exceeds this predetermined threshold level. The pressure valve assembly 214 illustrated in the embodiment of FIG. 6 is configured to maintain a preselected pressure within the fuel tank only during the fuel tank filling operation. At all other times of vehicle operation, the pressure valve assembly 214 is configured to permit venting of fuel vapor from the fuel tank in a generally unrestricted manner.

The pressure vacuum assembly 214 in the embodiment illustrated in FIG. 6 includes a platform 226 that is disposed above the valve stem 42. The platform 226 includes an upper surface 230 and a centrally disposed orifice 232 formed therethrough. A sealing ball 236 is provided to generally rest upon the upper surface 230 and to seat in the orifice 232 when the valve housing 212 is in a stationary condition. The upper surface 230 of the platform 226 and the size of the orifice 232 cooperate to permit the sealing ball 236 to be relatively easily displaced from the orifice 232 whenever the vehicle (not shown) and valve assembly 210 are disturbed, such as when the vehicle is being driven.

A baffle guide plate 218 is provided below the platform 226 to pilot the valve stem 42 as the valve stem 42 and spherical end 44 move toward the orifice 232 to seal the orifice 232. The movement of the valve stem 42 has been discussed in relation to other embodiments of this invention, and will not be further discussed here. Because the conical valve seat 23 illustrated in FIG. 5 is not included in the embodiment shown in FIG. 6, the baffle guide plate 218 is required to accurately guide the valve stem 42 and spherical end 44 to seal the orifice 232. The baffle guide plate 218 includes a central opening 220 that is sized to receive and laterally retain the valve stem 42. Vent openings 222 are provided in the baffle guide plate 218 to permit venting communication between the fuel tank and the pressure valve assembly 214. Illustratively, four vent openings 222 are provided that are circumferentially spaced around the baffle guide plate 218. The guide plate 218 also aids in preventing fuel from sloshing upwardly through the valve assembly 210 and into the canister (not shown)

A ball guide 240 is provided to retain the ball 236 generally above the orifice 232. As illustrated, the ball guide 240 is a generally cylindrically shaped member that has an inside diameter somewhat greater than the diameter of the ball 236. The greater diameter of the ball guide 240 is provided to permit the ball 236 to move laterally on the upper surface 230 whenever the vehicle is in motion. It will be understood that permitting the ball 236 to move laterally upon the upper surface 230 permits the ball 236 to move away from the orifice 232 to permit fuel vapor to vent through the orifice 232 and outwardly toward the canister (not shown). Thus, this lateral movement, or "rattle" of the ball 236 permits generally unrestricted venting of the fuel tank when the vehicle is in motion. However, when the vehicle is not in motion, the ball 236 provides a preselected, yieldable sealing force to seal the orifice 232 to maintain a preselected pressure within the fuel tank. This preselected pressure within the fuel tank is advantageous during the fuel filling operation of the fuel tank, and will be discussed in greater detail later.

The ball guide 240 is mounted in the valve housing 212 in a manner to create an annular space 242 between the lower end of the ball guide 240 and the upper surface 230 of the platform 226. This annular space 242 provides a venting passageway for the fuel vapor to vent to the canister (not shown). In addition to the space 242, openings 244 are included in the upper portion of the ball guide 240 to provide additional venting passageways for the fuel vapor.

FIG. 7 illustrates one possible use of the valve assembly 210 that is illustrated in FIG. 6. In particular, FIG. 7 shows the valve assembly 210 in place in a fuel tank 260 that may be installed in a vehicle (not shown). The fuel tank 260 is configured to hold a volatile fuel 262 that is capable of producing fuel vapor. The fuel tank 260 includes an upper wall 266 and a sidewall 268. As shown, the valve assembly 210 is fitted into the upper wall 266. It will be understood that the valve assembly 210 will normally be connected to a conventional canister (not shown) to receive the vented fuel vapor. It will be further understood that the valve assembly 210 could be positioned at other locations within the fuel system (not shown) other than that illustrated in FIG. 7. A filler neck 270 is shown extending upwardly and outwardly from the sidewall 268 of the fuel tank 260. The filler neck 270 includes an outer filler end 272 that is configured to receive fuel in any conventional manner. The filler neck 270 further includes an inner end 274 that joins with the sidewall 268 to provide fluid communication between the filler neck 270 and the fuel tank 260.

In operation, the valve assembly 210 functions similar to the embodiments shown in FIGS. 1-5 to permit fuel vapor to be vented from the fuel tank 260 to the canister (not shown). The valve assembly 210 differs from the embodiment illustrated in FIG. 5 in that when the vehicle (not shown) is in motion, the valve assembly 210 permits generally unrestricted venting of fuel vapor from the fuel tank 260. It will be understood that such generally unrestricted venting may be desirable in certain applications, while the embodiment in FIG. 5 may be desirable in other applications. In particular, valve assembly 210 is configured to maintain a preselected pressure, or "pressure head" within the fuel tank 260 only when the vehicle (not shown) is stationary. This preselected pressure head advantageously aids in preventing overfilling of the fuel tank 260 during the fuel filling operation.

Because the fuel 262 is capable of expanding within the fuel tank 260 under certain temperature conditions, and because the fuel 262 is capable of producing fuel vapor, it is desirable to limit the level of the fuel 260 somewhat below the upper wall 266 of the fuel tank 260 in the filling operation to accommodate this expansion of fuel or creation of fuel vapor. This space is illustrated in FIG. 7 as an expansion volume 278. The amount of the expansion volume 278 is generally dictated by the placement of the inner end 274 of the filler neck 270 below the upper wall 266. This distance is designated by the numeral 282 in FIG. 7. When the fuel level within the fuel tank 260 rises above the inner end 274 of the filler neck 270, the fuel being inserted into the filler neck 270 then rises up the filler neck 270 to provide an indication to either the operator or an automatic shut-off on the filling apparatus to shut off the input of fuel. When this procedure is followed, the desirable expansion volume 278 is created in the upper portion of the fuel tank 260.

When the filler neck 270 is full of fuel, the level of the fuel within the filler neck 270 will be normally higher than the level of the fuel within the fuel tank 260. This difference in levels of fuel within the filler neck 270 and the fuel tank 260 is designated by the numeral 280 in FIG. 7. It will be understood that this higher level of fuel in the filler neck 270 creates a pressure, or "pressure head" that is exerted into the fuel tank 260. This pressure head will vary depending upon the distance 280 that the level of fuel in the filler neck 270 exceeds the level of fuel in the fuel tank 260.

If the valve assembly 210 permitted generally unrestricted vapor release during this filling operation, it will be understood that the pressure head created by the fuel in the filler neck 270 could cause the expansion volume 278 to decrease. This could occur because the pressure within the expansion volume 278 would be permitted to vent through the vent assembly 210 which would allow the fuel in the filler neck 270 to flow into the fuel tank 26 to cause the level of fuel to rise in the fuel tank 260. As previously discussed, it is desirable to maintain the preselected amount of expansion volume 278 in the fuel tank 260. To prevent the level of fuel from rising in the fuel tank 260 due to the pressure head created by the fuel in the filler neck 270, it is necessary to maintain a pressure head in the fuel tank 260 to overcome the pressure head created in the filler neck 270.

To provide the pressure head in the fuel tank 260 necessary to maintain the desired amount of expansion volume 278, it is necessary to seal the venting capability of the valve assembly 210 during the filling operation. To provide this sealing, the ball 236 is configured to seat in the orifice 232 when the vehicle is stationary. This permits the ball 236 to seal the orifice 232 to close off the venting capability of the valve assembly 210. The weight of the ball 236 is selected to maintain the proper pressure head within the fuel tank 260 to maintain the desired amount of expansion volume 278. Illustratively, if the filler neck 270 extends 10 inches above the upper wall 266 of the fuel tank 260, then the ball 236 can be selected to maintain a pressure head of 12 inches in the fuel tank 260. This will prevent the pressure head created in the filler neck 270 from reducing the desired amount of expansion volume 278 in the fuel tank 260.

After the filling operation is complete, and the proper expansion volume 278 has been created, it is desirable to permit generally unrestricted venting from the fuel tank 260 through the valve assembly 210. To permit this generally unrestricted venting, the ball 236, ball guide 240, and upper surface 230 of the platform 226 cooperate to permit the ball 236 to rattle within the ball guide 240 to open the orifice 232. By permitting the ball 236 to move away from the orifice 232, the valve assembly 210 then permits fuel vapor to vent from the fuel tank 260 in a generally unrestricted manner. Thus, as long as the vehicle (not shown) is in motion, the ball 236 is generally disabled from sealing the orifice 232. It will be understood that should the vehicle (not shown) remain stationary for a lengthy period of time after filling, the pressure in the fuel tank 260 could increase due to temperature. If the pressure in the fuel tank 260 exceeds the preselected sealing force of the ball 236, the ball 236 will be displaced from the orifice 232 momentarily to permit the pressure to vent through the valve assembly 210.

The embodiment illustrated in FIGS. 6 and 7 permits fuel vapor to vent from the fuel tank 260 whenever the vehicle (not shown) is in motion. In addition, the provision of the ball 236 allows a pressure head to be maintained in the fuel tank 260 during the fuel filling operation to aid in preventing overfilling of the fuel tank 260.

Figure 10:
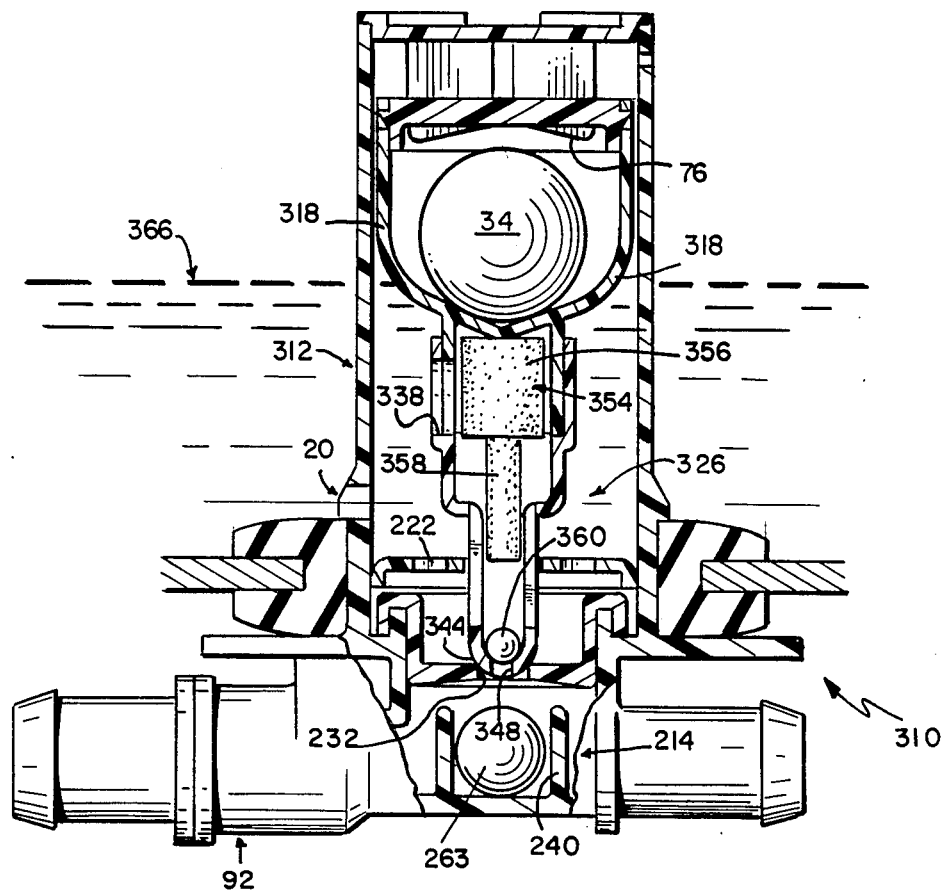
FIG. 10 is a transverse sectional view of the embodiment illustrated in FIG. 8 in a substantially inverted orientation.

FIGS. 8-10 show another embodiment of the invention that is a modification of the embodiment illustrated in FIGS. 6 and 7. Those elements referenced by numbers identical to those in FIGS. 1-7 perform the same or similar function. In the embodiment of the valve assembly 310 shown in FIG. 8, the valve housing 312 includes a pressure valve assembly 214 identical to that illustrated in FIGS. 6 and 7 to control the discharge of pressure from within a fuel tank (not shown). The valve assembly 310 includes a stem assembly 326 that has been modified somewhat when compared to the stem 42 of the embodiment shown in FIG. 6. Specifically, the stem assembly 326 includes an upper hole 348 that cooperates with air flow slots 350 to prevent the formation of a low pressure area that might otherwise be formed above the end 344 of the stem assembly 326 due to air or vapor flowing over the curved surfaces of the end 344 and through the orifice 232 in the platform 226. By preventing the formation of such a low pressure area, the likelihood that the stem assembly 326 could be prematurely lifted to seal the orifice 232 is eliminated. A ball 360 and float 354 are provided within the stem assembly 326 to provide two-stage sealing of the hole 348 under certain predetermined conditions to permit the stem assembly 326 to seal the orifice 232 to prevent fuel from flowing through the pressure valve assembly 214.

The valve assembly 310 in the embodiment illustrated in FIG. 8 includes a ball-receiving cup 318 that is somewhat different than the cup 40 illustrated in the embodiment of FIG. 6. Specifically, the cup 318 includes an upper ramp portion 320 that terminates in a raised portion 322 at the center of the cup 318. A stem assembly 326 is centered over the raised portion 322 and extends upwardly through the baffle guide plate 218 toward the orifice 232. Illustratively, the stem assembly 326 includes two separable components for ease of assembly. Specifically, a cylindrical upstanding wall component 328 is attached to the upper surface of the cup 318 and centered over the raised portion 322. An elongated stem 330 is provided that is slidably engageable with the wall component 328 to form the stem assembly 326.

When assembled, the stem assembly 326 includes a lower chamber 336 that is formed to include at least one fuel flow slot 338. The fuel flow slot 338 permits fluid communication between the chamber 336 and the interior of the valve housing 312. An upper, reduced diameter chamber 340 extends from the chamber 336 to the end 344 of the stem assembly 326. A hole 348 is formed in the end 344 of the stem assembly 326, with the center of the hole 348 substantially aligned with the center of the orifice 232 in the platform 226. The diameter of the hole 348 is somewhat smaller than the diameter of the orifice 232. Air flow slots 350 are formed in the sides of the stem assembly 326 to permit venting communication between the upper chamber 340, the interior of the valve housing 312, and the hole 348.

The hole 348 in the end 344 of the stem assembly 326 and the air flow slots 350 cooperate to prevent the formation of a low pressure area that might otherwise be formed above the end 344 of the stem assembly 326 by air or vapor flowing over the curved surfaces of the end 344 in the restricted area between the end 344 and the periphery of the orifice 232, and through the orifice 232. It has been found that air flow amounts above a specified level can create a low pressure area above the end 344 of sufficient strength to lift the stem assembly 326 upwardly to prematurely seal the orifice 232 in the absence of the hole 348 and air flow slots 350. The hole 348 and air flow slots 350 cooperate to permit air to flow outwardly through the hole 348 from the upper chamber 340 to prevent the formation of any low pressure area above the end 344. Specifically, air flows into the upper chamber 340 through the air flow slots 350 and out through the hole 348 to equalize the pressure above the end 344. It will be understood that this equalization of pressure prevents the formation of any low pressure area above the end 344, which in turn prevents any lifting force from being applied to the stem assembly 326.

A float 354 is provided that is disposed within the stem assembly 326. The float 354 may be a hollow metal float, or may be formed from a material that is buoyant in fuel. Specifically, it is desirable for the float material to have a specific gravity of approximately 0.25 to ensure that the float 354 will be buoyant in fuel. The float 354 includes a lower, generally cylindrical portion 356 and an upper, reduced diameter portion 358. The lower portion 356 is sized such that it is capable of axial movement within the lower chamber 336 of the stem assembly 326. The upper portion 358 of the float 354 is sized such that it is capable of axial movement within the upper chamber 340 of the stem assembly 326. Because of its construction, the float 354 is configured to move axially upwardly within the stem assembly 326 in response to fuel (FIGS. 9 and 10) that may flow into the upper and lower chambers 336, 340 through the fuel flow slot 338 under certain conditions. The lower portion 356 of the float 354 is configured to rest on the raised portion 322 to permit the float 354 to respond directly to any such in-flowing fuel. It will be understood that positioning the lower portion 356 on the raised portion 322 acts to prevent any possible adhesion that might otherwise occur between the bottom surface of the lower portion 356 and the bottom of the lower chamber 336. Axially extending ribs 364 are provided that are circumferentially spaced about the inner surface of the stem assembly 326 in the lower chamber 336. The ribs 364 act to guide and direct the float 354 as it axially moves within the stem assembly 326.

A ball 360 is provided that is disposed above the upper portion 358 of the float 354 within the upper chamber 340. The ball 360 is configured and sized to seal the hole 348 in the end 344 of the stem assembly 326 under certain predetermined conditions. The diameter of the ball 360 is somewhat greater than the size of the air flow slots 350 so that the ball 360 will be retained within the upper chamber 340. It will be understood that it is necessary to seal the hole 348 to permit the stem assembly 326 to effectively seal the orifice 232 when the stem assembly 326 is moved axially toward the orifice 232 in response to movement of the ball 34 within the cup 318. The movement of the ball 34 in response to tilting of the valve assembly 310 is identical to the movement of the ball 34 described previously related to FIGS. 1-5. Specifically, it will be understood that without sealing the hole 348, the stem assembly 326 cannot seal the orifice 232 because of the communication that would be established between the hole 348 and the air flow slots 350.

FIG. 9 shows one stage of sealing of the hole 348 by the ball 360 after the valve assembly 310 has been tilted to a predetermined angle. Illustratively, the valve assembly 310 has been tilted to an angle somewhat greater than 15° to cause the ball 34 to move within the cup 318 to raise the stem assembly 326 upwardly to a position where the end 344 is engaging the orifice 232. It will be understood that, because the valve assembly 310 is in direct communication with a vehicle fuel tank (not shown), fuel 366 may enter the valve housing 312 through the openings 20. The float 354, having a lower specific gravity than the fuel 366, will move within the stem assembly 326 to urge the ball 360 upwardly to seal the hole 348 in the end 344. In this position, the orifice 232 is sealed to prevent any of the fuel 366 from being discharged from the valve assembly 310 through the pressure valve assembly 214. Thus, in this stage of operation, the float 354 and ball 360 cooperate within the stem assembly 326 to seal the hole 348 to permit effective sealing of the orifice 232 by the stem assembly 326 in response to tilting and the presence of fuel 366 within the valve assembly 310. It will be understood that the float 354 will operate in the presence of fuel 366 to urge the ball 360 toward the hole 348 when the valve assembly 310 is tilted to a tilting position in the range of beyond 15° up to approximately 90°.

FIG. 10 shows a second stage of sealing of the hole 348 by the ball 360. Specifically, FIG. 10 shows the valve assembly 310 in a substantially inverted orientation. The ball 360 has been urged by gravity to seal the hole 348 in the end 344 of the stem assembly 326. The ball 34 has moved within the cup 318 to move the stem assembly 326 to a position where the end 344 is engaging the orifice 232. Fuel 366 from the vehicle fuel tank (not shown) is thus prevented from escaping from the valve assembly 310 through the pressure valve assembly 214 by the stem assembly 326 sealing the orifice 232 and the ball 360 sealing the hole 348. It will be understood that in this orientation, the ball 360 does not require the urging force from the float 354 to seal the hole 348 as was required in the orientation illustrated in FIG. 9. Therefore, the float 354 is permitted to float axially away from the ball 360 in the orientation illustrated in FIG. 10 to a non-use position without affecting the sealing capability of the ball 360. It will be understood that the ball 360 will be urged by gravity to seal the hole 348 when the valve assembly 310 is tilted to a tilting position past approximately 90°.

Thus, the valve assembly 310 illustrated in FIGS. 8-10 is capable of preventing any lifting force due to high flow rates of vapor or air over the end 344 of the stem assembly 326. The provision of the float 354 and ball 360 permits effective sealing of the orifice 232 to prevent fuel from being discharged from the valve assembly 310. The ball 360 and float 354 cooperate to seal the hole 348 under predetermined conditions to permit the stem assembly 326 to function much like the stem 42 in the embodiments illustrated in FIGS. 1-6.

Although the invention has been described in detail with reference to certain preferred embodiments, variations and modifications exist within the scope and spirit of the invention as described and defined in the following claims.

What is claimed is:

1. A roll-over valve for use in a vehicle fuel system having an outlet for discharging fuel vapor, the roll-over valve comprising
 a hollow valve member terminating in a distal tip formed to include a top aperture and having a side wall formed to include at least one side aperture,
 roll-over means for moving the distal tip from an outlet-opening position to an outlet-closing position in response to tilting the hollow valve member during vehicle rollover conditions, and
 closing means in the hollow valve member for closing the top aperture in response to predetermined tilting movements of the hollow valve member so that passage of fuel through the outlet is blocked.

2. The roll-over valve of claim 1, wherein the closing means includes a ball configured to sealingly close the top aperture and a buoyant member underlying the ball, the buoyant member floating on liquid fuel admitted into the hollow valve member through the at least one side aperture to urge the ball toward its top aperture-closing position as the depth of liquid fuel in the hollow valve member rises.

3. The roll-over valve or claim 1, wherein the closing means includes a closing member configured to sealingly close the top aperture and sensor means for sensing accumulation of liquid fuel in the hollow valve member in excess of a predetermined amount, the sensor means providing means for selectively actuating the closing member so that the top aperture is closed upon introduction of liquid fuel in excess of the predetermined amount into the hollow valve member.

4. The roll-over valve of claim 1, wherein the closing means includes a ball configured to sealingly close the top aperture, the ball moving in the hollow valve member under gravity to its top aperture-closing position during a selected first range of tilting positions of the hollow valve member.

5. The roll-over valve or claim 4, wherein the closing means further includes float means for urging the ball in the hollow valve member toward its top aperture-closing position in response to accumulation of liquid fuel in the hollow valve member in excess of a predetermined amount so that the ball is moved by the float means to sealingly close the top aperture during a selected second range of tilting positions of the hollow valve member as long as liquid fuel in excess of the predetermined amount is present in the hollow valve member.

6. The roll-over valve of claim 5, wherein the hollow valve member has a longitudinal axis which pivots between an upright orientation and tilted orientations during tilting movement of the hollow valve member, each included angle between said upright and tilted orientations corresponding to one of said selected tilting positions, and the magnitude of the included angles corresponding to the selected second range of tilting positions is less than the magnitude of the included angles corresponding to the selected first range of tilting positions.

7. The roll-over valve of claim 1, wherein the roll-over means includes a fixed frame in the fuel system surrounding the outlet, a ball-receiving cup coupled to the hollow valve member for movement therewith relative to the fixed frame, and a roll-over ball disposed between the cup and the frame, the roll-over ball being cooperable with the movable cup and the relatively fixed frame for translating radial movement of the roll-over ball into axial movement of the hollow valve member, thereby moving the distal tip into and out of engagement with the outlet.

8. The roll-over valve of claim 7, wherein the fixed frame provides means for guiding the hollow valve member along a predetermined path as the distal tip moves between its outlet-opening and outlet-closing positions.

9. A roll-over valve for use in a vehicle fuel system, the roll-over valve comprising
a hollow valve housing having a longitudinal axis, an inlet for admitting fuel vapor from the vehicle fuel system into the valve housing, and an outlet for discharging the fuel vapor from the valve housing,
a hollow valve member positioned within the hollow valve housing for movement between an outlet-opening position and an outlet-closing position, the hollow valve member including a closing piece for selectively blocking the outlet, the closing piece being formed to include a ball-receiving chamber and terminating in a distal tip formed to include a top aperture, and a body formed to include a float chamber communicating with the ball-receiving chamber, the hollow valve member being formed to include inlet means for admitting liquid fuel from the vehicle fuel system into at least the float chamber,
a sealing ball disposed in the hollow valve member, and
a buoyant member disposed in the float chamber and movable therein, the buoyant member having an arm extending into the ball-receiving chamber to support the sealing ball in the ball-receiving chamber, the buoyant member floating on liquid fuel that may be introduced into the float chamber during vehicle roll-over conditions causing the sealing ball to move toward sealing engagement with the outlet as the depth of liquid fuel in the float chamber rises.

10. The roll-over valve of claim 9, further comprising roll-over means in the hollow valve housing for moving the closing piece from an outlet-opening position to an outlet-closing position in response to predetermined tilting movements of the hollow valve housing.

11. The roll-over valve of claim 9, wherein the closing piece includes a side wall formed to include at least one side aperture for admitting air and fuel into the ball-receiving chamber, the side aperture being sized to prevent escape of the sealing ball therethrough during movement of the sealing ball in the hollow valve member.

12. The roll-over valve of claim 9, wherein the buoyant member has an exterior bottom wall and the body has an interior bottom wall configured to provide means for engaging a selected region of the exterior bottom wall of the buoyant member as long as the depth of fuel in the float chamber is less than a selected threshold level to maximize the exposure of the exterior bottom wall of the buoyant member to liquid fuel admitted into the float chamber, thereby enhancing flotation characteristics of the buoyant member during vehicle roll-over conditions.

13. The roll-over valve of claim 9, wherein the body includes an interior side wall and the hollow valve member further includes alignment means for maintaining the buoyant member in substantially spaced-apart relation to the interior side wall during movement in the float chamber to permit liquid fuel admitted into the float chamber to flow easily in the space provided between the buoyant member and the interior side wall, thereby enhancing flotation characteristics of the buoyant member during vehicle roll-over conditions 14. The roll-over valve or claim 9, wherein the alignment means is provided by a plurality of radially inwardly extending, circumferentially spaced ribs fixed to the interior side wall of the body.

15. The roll-over valve of claim 9, wherein the sealing ball is freely movable within the ball-receiving chamber in a space above the support arm of the buoyant member so that the sealing ball moves in the hollow valve member under gravity to a top aperture-closing position in response to predetermined tilting movements of the hollow valve member during vehicle roll-over conditions.

16. The roll-over valve of claim 9, wherein the hollow valve member further includes a ball-receiving cup and further comprises base means for retaining the hollow valve member within the valve housing, the base means being coupled to the valve housing to define a ball-receiving space therebetween, and a roll-over ball positioned in the ball-receiving space, at least one of the base means and the ball-receiving cup including ramp means for contacting the roll-over ball in the ball-receiving space, the roll-over ball riding on the ramp means in a radially-outward direction to move the closing piece of the hollow valve member to an outlet-closing position in response to predetermined tilting movements of the hollow valve member during vehicle roll-over conditions.

17. The roll-over valve of claim 16, wherein the ramp means includes a first inclined ramp portion on the ball-receiving cup and a second inclined ramp portion on the base means, the first and second inclined ramp portions are situated in opposing spaced-apart relation to define the ball-receiving space therebetween, and the roll-over ball rides on both ramp portions to move the hollow valve member to its outlet-closing position.

18. In a roll-over valve for use in a vehicle fuel system including outlet means for discharging the fuel vapor in the vehicle fuel system, a hollow closing piece for selectively closing the outlet means, and roll-over means for moving the hollow closing piece from an outlet-opening position to an outlet-closing position in response to predetermined tilting movements of the roll-over valve, the improvement comprising
aperture means in the hollow closing piece for minimizing aerodynamic lift exerted on the closing piece due to a high flow condition existing in a venturi passage formed between the closing piece and adjacent the outlet means to aid in preventing premature engagement of the closing piece with the outlet means, and
sealing means within the interior of the hollow closing piece for sealingly closing the aperture means in response to predetermined tilting movements of the roll-over valve so that flow of fuel from the vehicle fuel system through the outlet means is blocked.

19. The improvement of claim 18, wherein the hollow valve member includes a distal tip formed to include a top aperture and a side wall formed to include at least one side aperture, the top aperture and the at least one side aperture cooperating to provide said aperture means.

20. The improvement of claim 19, wherein the sealing means includes a ball configured to sealingly close the top aperture and a buoyant member underlying the ball, the buoyant member floating on liquid fuel admitted into the hollow closing piece through the at least one side aperture to urge the ball toward its top aperture-closing position as the depth of liquid fuel in the hollow closing piece rises.

* * * * *